US005229586A

United States Patent [19]

Ishii

[11] Patent Number: 5,229,586

[45] Date of Patent: Jul. 20, 1993

[54] CARD ISSUING APPARATUS HAVING SEQUENTIAL PROCESSING UNITS

[75] Inventor: Hiromoto Ishii, Mishima, Japan

[73] Assignee: Tokyo Electric Co., Ltd., Tokyo, Japan

[21] Appl. No.: 836,153

[22] Filed: Feb. 13, 1992

Related U.S. Application Data

[63] Continuation of Ser. No. 427,175, Oct. 25, 1989.

[30] Foreign Application Priority Data

Oct. 28, 1988 [JP] Japan ............................... 63-272603

[51] Int. Cl.[5] .......................... G06K 7/08; G06K 1/00

[52] U.S. Cl. ....................................... 235/375; 235/449

[58] Field of Search ............... 235/375, 379, 380, 384, 235/436, 449, 462, 474, 376; 364/521; 400/103; 101/232

[56] References Cited

U.S. PATENT DOCUMENTS

| | | | |
|---|---|---|---|
| 4,381,705 | 5/1983 | Roes et al. | 209/569 |
| 4,560,293 | 12/1985 | McCumber et al. | 101/232 |
| 4,672,182 | 6/1987 | Hirokawa | 235/436 |
| 4,679,154 | 7/1987 | Blanford | 235/462 |
| 4,716,799 | 1/1988 | Hartmann | 83/42 |
| 4,733,060 | 3/1988 | Dono et al. | 235/379 |
| 4,992,647 | 2/1991 | Konishi et al. | 235/384 |

FOREIGN PATENT DOCUMENTS

| | | |
|---|---|---|
| 0269121 | 6/1988 | European Pat. Off. . |
| 59-35267 | 2/1984 | Japan . |
| 63-21265 | 4/1988 | Japan . |
| 63-41103 | 8/1988 | Japan . |

*Primary Examiner*—David L. Willis
*Assistant Examiner*—Edward Sikorski
*Attorney, Agent, or Firm*—Frishauf, Holtz, Goodman & Woodward

[57] ABSTRACT

A card issuing apparatus comprising a convey path for a card, a conveying section for moving the card along the convey path, a magnetic card reading/writing device and a thermal printer which are arranged on the convey path and sequentially subject the card to magnetical recording and printing, respectively. The card issuing apparatus further comprises a main processor connected to receive boarding information, for converting the boarding information into control data for the magnetical recording and the printing, a memory section for storing the control data supplied from the main processor, and a sub-processor for causing each of the magnetic card reading/writing device and the thermal printer to process the card according to corresponding control data stored in the memory section while the card passes through the magnetic card reading/writing device and the thermal printer.

6 Claims, 4 Drawing Sheets

CARD ISSUING APPARATUS HAVING SEQUENTIAL PROCESSING UNITS

This application is a continuation of application Ser. No. 07/427,175, filed Oct. 25, 1989 now abandoned.

BACKGROUND OF THE INVENTION

1. Field of the Invention

This invention relates to a card issuing apparatus for sequentially issuing cards that have been subjected to a number of processing steps using supplied information, and more particularly to a card issuing apparatus of the above described category that records card information on each card in a number of separate steps while it is being conveyed along a line.

2. Description of the Related Art

These days, a large number of people utilize airports and air transportation, and the number of such people is ever increasing. Where an automated block wicket is installed at the boarding gate of a passenger lounge of an airport for automatic examination of passengers' boarding tickets, a boarding ticket having a magnetic stripe on it is given to every passenger who checks in at the passenger counter. When the passenger inserts this boarding ticket into the automated block wicket, it reads the destination, the flight number, the seat number and other information recorded on the magnetic stripe of the ticket and, if validation is confirmed, the block wicket is automatically opened to admit the passenger.

A conventional card issuing apparatus for issuing boarding tickets with a magnetic stripe operates in the manner as described below. Such a card issuing apparatus normally stores in a stocker a number of ticket cards, which are taken out one by one from the stocker. The ticket card is then placed on the end of a convey path and moved along the convey path by means of a conveying mechanism until it reaches the card issuing slot provided at the other end of the path. Along the convey path, there are arranged a magnetic card reading/writing device, a printer and a plurality of card sensors. These card sensors are designed to detect the positioning of the card as it moves along the convey path and the output signals of the card sensors are utilized for controlling the conveying mechanism, and the magnetic card reading/writing device, as well as the printer. When the card reaches the position for activating the magnetic card reading/writing device, it magnetically writes data corresponding to the boarding information on the magnetic strip which is formed on the back side of the card. As the card moves further along the path and reaches the position for activating the printer, the printer prints data corresponding to the boarding information on the front side of card. The conveying mechanism, the magnetic card reading/writing device and the printer are respectively controlled by first, second and third sub-processors for operation, whereas the first through third sub-processors are controlled by a single main processor for operation.

More specifically, the main processor supplies boarding information to the second and third sub-processors, which information is supplied from the host computer of the airline connected to the main processor via a communication network when the card issuing apparatus is activated, and at the same time sequentially gives the first, the second and the third sub-processors activating instructions. Upon receiving its activating instruction, the first sub-processor instructs the conveying mechanism to move the paper card. Similarly, the second sub-processor, in response to the instruction given to it, converts the boarding information into data for magnetic recording and instructs the magnetic card reading/writing device to write the data on the card and confirm the written data. Finally, upon receiving its instruction, the third sub-processor converts the boarding information into data for printing and instructs the printer to print the data on the card.

Normally a processor with a capacity of 8 bits or so is used for each of the first through third subprocessors as described above, as a small control program is used for the desired control operation. However, such a small capacity processor requires a relatively long period of time for the arithmetic operation to be conducted in order to convert the boarding information into data for magnetic recording or printing. While the time required for issuing a boarding ticket can be reduced to some extent by increasing the moving speed of the card, the data for magnetic writing as well as the data for printing may not be ready if the moving speed of the card is increased too much, without giving due consideration to the time required for arithmetic operation as described above. Consequently, the maximum card moving speed is limited by the speed of the arithmetic operations of the sub-processors involved, thus hindering the satisfactory reduction of the overall time required for issuing a card in a conventional card issuing apparatus.

SUMMARY OF THE INVENTION

It is therefore an object of the present invention to provide a card issuing apparatus that can issue a card within a period of time which is significantly reduced from the time required for issuing a card in a conventional card issuing apparatus, without damaging the contollability for various card processing steps.

According to the invention, this object and other objects of the present invention are achieved by providing a card issuing apparatus comprising a convey path for a card, a conveying system for moving cards along said card convey path, a plurality of card processing sections arranged on said convey path for sequentially subjecting the card to predetermined processings, a first data processing circuit connected to receive card information for converting the card information into control data for the predetermined processings, a memory section for storing the control data supplied from the first data processing circuit and a second data processing circuit for causing each card processing section to process the card according to the corresponding control data stored in the memory section while the card passes through the card processing section.

In a card issuing apparatus according to the present invention, boarding information is converted into control data for the predetermined processings, by the first data processing circuit, then stored in the memory section. Since the card processing sections are directly controlled by the second data processing circuit of the apparatus, the first data processing circuit can perform its arithmetic operation for the conversion without the interruption normally required for activating each card processing section by a conventional card issuing apparatus. Moreover, once the first data processing section completes the preparation of the control data for a predetermined processing, it quickly starts preparation of the control data for the next predetermined processing, which allows the conveying system to move the card much faster than its counterpart in any conventional card issuing apparatus, even when a very large number of steps are required in the arithmetic operation for obtaining control data for a particular card processing means. Besides, the fact that unlike the second data processing circuit, the first data processing circuit does not directly control the card processing means and only one circuit always suffices, the first data processing operation makes it possible to use a general purpose processor having a high operational capability as the first data processing section, without deteriorating its ability to control the card processing section, and thus reduces the overall cost.

Now the present invention will be described in greater detail by referring to the accompanying drawings which illustrate a preferred embodiment of the invention.

DETAILED DESCRIPTION OF THE PREFERRED EMBODIMENTS

Figure 1:
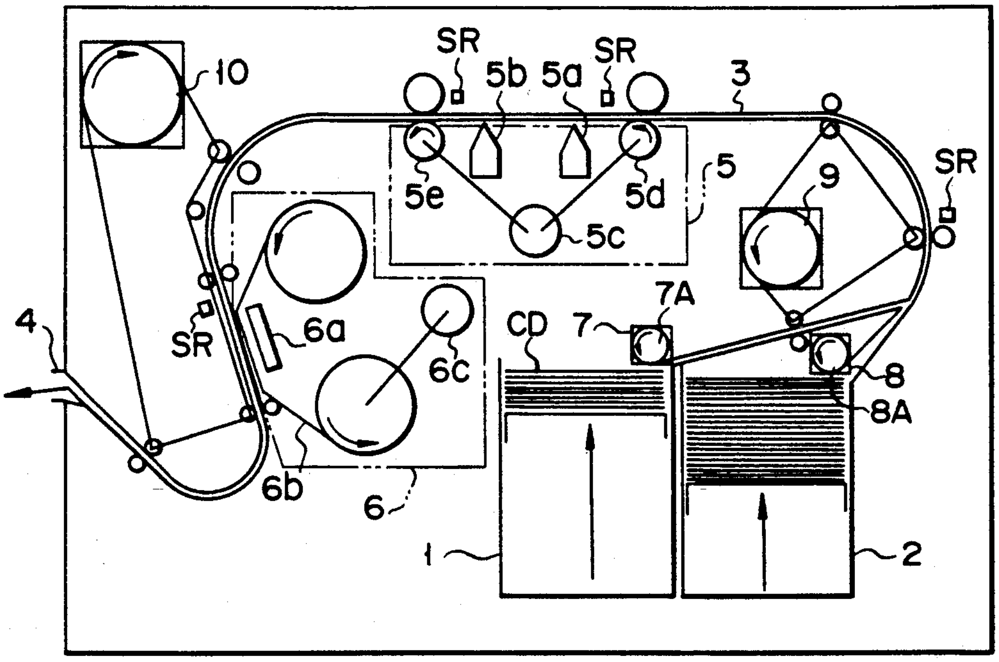
FIG. 1 is an illustration schematically showing the inside of an embodiment of the invention.
Figure 2:
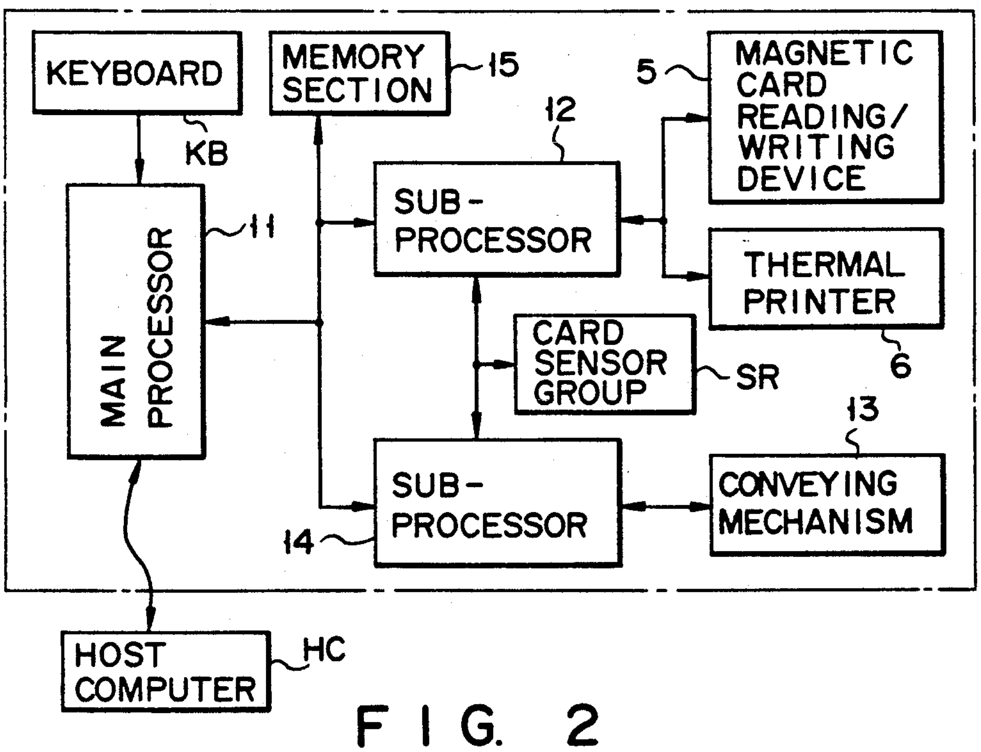
FIG. 2 is a schematic block diagram of the control circuit of the embodiment.
Figure 3:
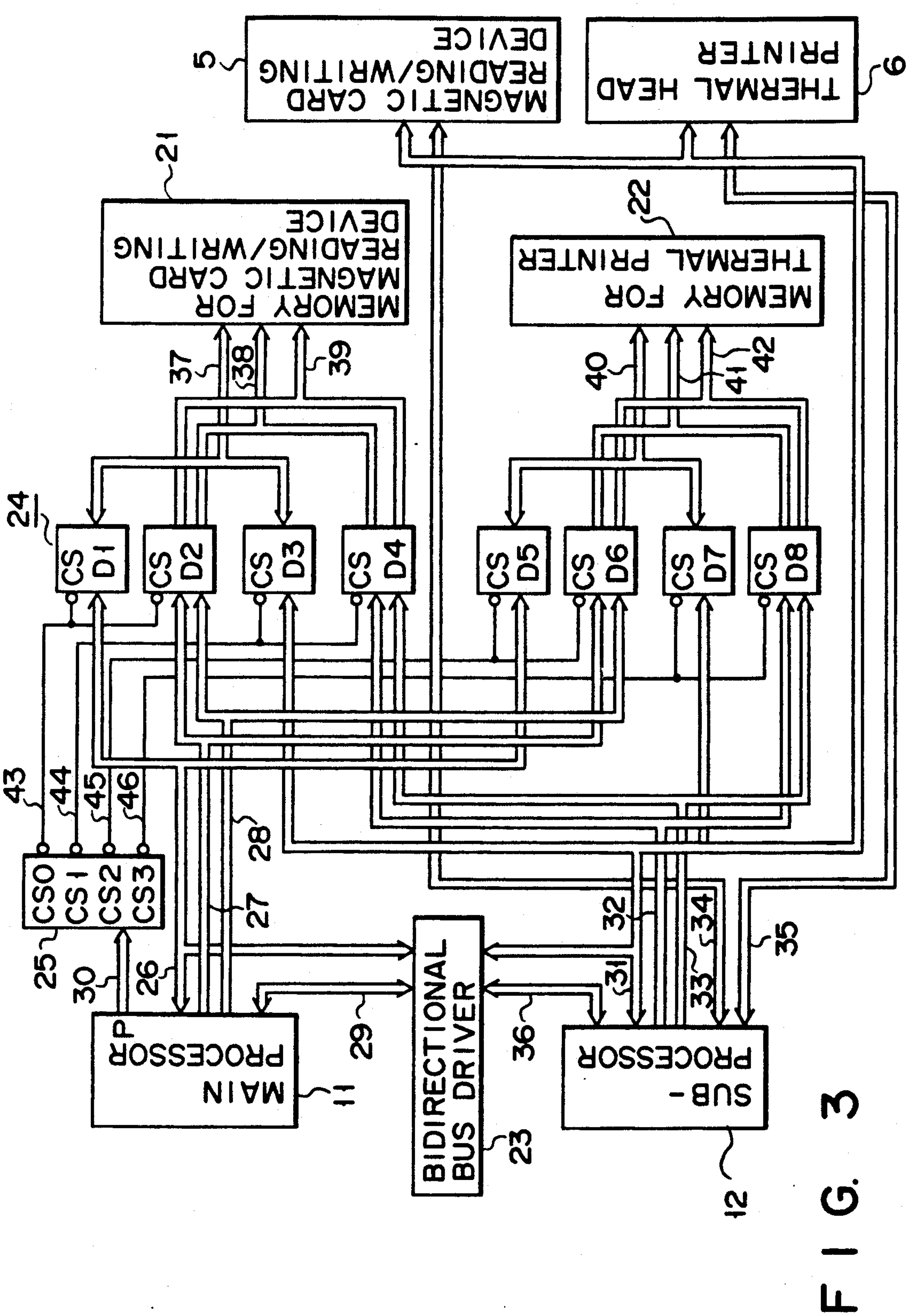
FIG. 3 is a detailed circuit diagram showing a part of the control circuit of FIG. 2.

FIGS. 1 through 3, illustrate an embodiment specifically designed for issuing boarding cards for aircraft. FIG. 1 schematically shows the inside of the embodiment comprising stockers 1 and 2 for storing paper cards CD, each having a magnetic stripe as in the case of a card issued by a conventional card issuing apparatus, a convey path 3 for conveying card CD taken out from one of the stockers 1 and 2 up to card issuing slot 4, a magnetic card reading/writing device 5 and a thermal printer 6, said magnetic card reading/writing device 5 and said thermal printer 6 being arranged along said convey path. This magnetic card reading/writing device 5 is constituted by a writing head 5*a*, a reading head 5*b*, a motor 5*c*, and a pair of guide rollers 5*d* and 5*e*. Thermal printer 6 is constituted by a thermal transfer head 6*a*, an ink ribbon 6*b* and a ribbon feed motor 6*c*. The stocker 2 is provided as a back-up to be used when the stocker 1 contains no cards. The cards CD stored in the stockers 1 and 2 are taken out one by one by means of either a pick-up roller 7A, driven by a motor 7, or a pick-up roller 8A, driven by a motor 8, and moved on either of the conveyor rollers, arranged along the convey path and driven respectively by motors 9 and 10, toward the card issuing slot 4. As card CD passes the magnetic card reading/writing device 5, the writing head 5*a* magnetically writes data corresponding to the supplied boarding information on the magnetic stripe on the back of the card CD, and the reading head 5*b* reads the data in order to verify that the data is recorded correctly. After the completion of this step, the card CD is moved to the thermal printer 6 and, as the card passes therethrough, it prints data corresponding to the supplied boarding information on the front surface of the card by means of the thermal transfer head 6*a*. After the completion of the printing operation, the card CD is ejected out of the card issuing slot 4.

FIG. 2 schematically shows the control circuit of the embodiment, having a main processor 11 and sub-processors 12 and 14, of which the main processor 11 is designed to control the sub-processors 12 and 14, whereas the sub-processor 12 is provided to control the magnetic reading/writing device 5 and the thermal head printer 6, and the sub-processor 14 is provided to control a conveying mechanism 13 including the motors 7, 8, 9 and 10 and other items such as solenoids and sensors which are not shown. The main processor 11 is a 16-bit microprocessor containing a ROM and a RAM, whereas each of the sub-processors 12 and 14 is an 8-bit microprocessor with a built-in ROM and a built-in RAM. The ROM of the microprocessor 12 and that of the microprocessor 14 both store in advance, fixed data including control programs and a variety of conversion tables, whereas each of the RAMs temporarily stores variable data such as boarding information and processed data. The main processor 11 converts the boarding information supplied from external host computer HC into data for magnetic recording and data for printing and stores them in memory 15 during the boarding tickets issuing operation. Besides this, the main processor 11 has the role of giving instructions to the sub-processors 12 and 14 to respectively activate the magnetic card reading/writing device 5, the thermal printer 6 and the conveying mechanism 13. The sub-processor 14 causes the conveying mechanism 13 to transport card CD in response to the instruction given by the main processor 11. The sub-processor 12 reads the data for magnetic recording and the data for printing stored in the memory 15 and causes the magnetic card reading/writing device 5 and the thermal printer 6 to carry out their operations of recording data on the card CD in response to the instruction given by the main processor 11 to activate the magnetic card reading/writing device 5 and the thermal printer 6. Also a number of card sensors SR are arranged along the convey path 3 to detect the position of the card CD and the output signals of the sensors SR are transmitted to the sub-processors 12 and 14. Keyboard KB is used for entering instructions for issuing boarding tickets and controlling the number of tickets to be issued.

FIG. 3 is a detailed illustration of a part of the control circuit of FIG. 2. Memory section 15 comprises a memory 21 which stores data for magnetic recording to be supplied to the magnetic card reading/writing device 5 for recording, and a memory 22 for storing data to be supplied to the thermal printer 6 for printing. The main processor 11 is connected with the sub-processor 12 via a strobe type bidirectional bus driver 23. The memories 21 and 22 are connected with the sub-processors 11 and 12 via a group of bus drivers 24. Each of the bus drivers 24 is connected with a selector memory 25 for transmitting CS (chip select) signals. The group of bus drivers 24 comprises eight bus drivers D1 through D8, of which bus drivers D1, D3, D5 and D7 are 3-state type bidirectional bus drivers and bus drivers D2, D4, D6 and D8 are 3-state type unidirectional bus drivers.

When described more specifically in terms of the mutual connection of the components, the main processor 11 is connected with the bidirectional bus driver 23 and the bus drivers D1 and D5 via a data bus 26 and with the bus drivers D2 and D6 via an address bus 27 and a control bus 28. The main processor 11 is also connected with the bidirectional bus driver 23 via a control bus 29. A data bus 30 connects output port P of the main processor 11 and the input port of the memory selector 25.

On the other hand, the sub-processor 12 is connected with the bidirectional bus driver 23, the bus drivers D3 and D7, the magnetic card reading/writing device 5 and the thermal head printer 6 via a data bus 31 and with the bus drivers D4 and D8 via an address bus 32 and a control bus 33. The sub-processor 12 is also connected with the magnetic card reading/writing device 5 via a control bus 34 and with the thermal head printer 6 via a control bus 35 as well as with the bidirectional bus 23 via a control bus 36.

The memory 21 for the magnetic card reading/writing device 5 is connected with the bus drivers D1 and D3 via a data bus 37 and with the bus drivers D2 and D4 via an address bus 38 and a control bus 39.

The memory 22 for the thermal head printer 6 is connected with the bus drivers D5 and D7 via a data bus 40 and with the bus drivers D6 and D8 via an address bus 41 and a control bus 42.

As for the memory selector 25, the output terminal thereof for signal CS0 is connected with the chip select CS terminal of the bus driver D1 and that of the bus driver D2 via a signal line 43. Similarly, the output terminal of the memory selector 25 for signal CS1 is connected with the CS terminal of the bus driver D3 and that of the bus driver D4 via a signal line 44, while the output terminal of the memory selector 25 for signal CS2 is connected with the CS terminal of the bus driver D5 and that of the bus driver D6 via a signal line 45 and the output terminal of the memory selector 25 for signal CS3 is connected with the CS terminal of the bus driver D7 and that of the bus driver D8 via a signal line 46.

Figure 4:
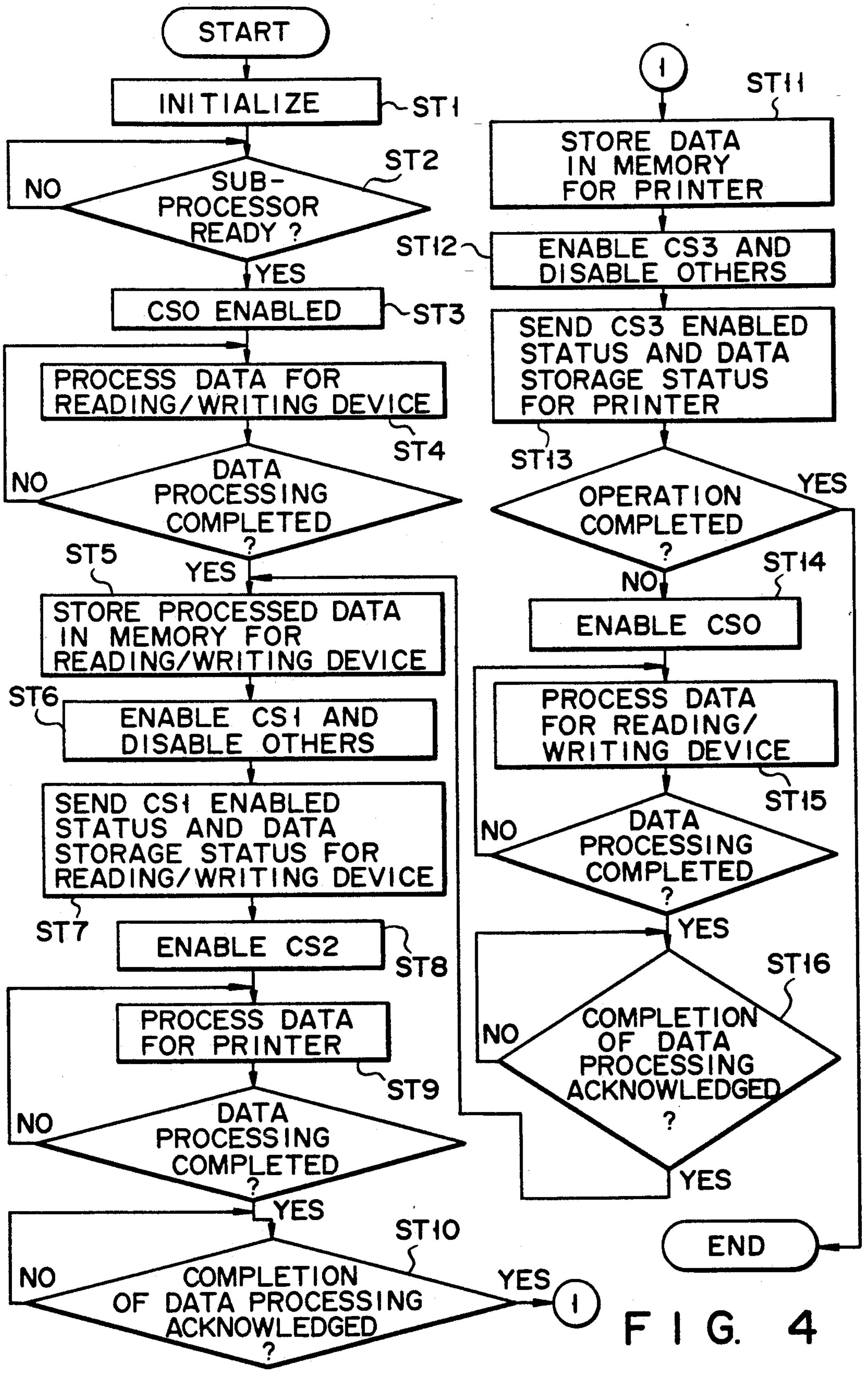
FIGS. 4 and 5 are flow charts showing the operation of the control circuit.

Now referring to FIGS. 4 and 5, the card issuing apparatus operates in the following manner. When boarding information is supplied from the host computer HC and an instruction for issuing a card ticket is given through the keyboard KB, the main processor 11 starts executing a given program as illustrated in the flow chart of FIG. 4. Firstly at step ST1 the main processor 11 determines the effective direction of the bidirectional bus driver 23 via the control bus 29 and transmits status data to the sub-processor 12 for initialization via the bus lines 26 and 31. The sub-processor 12, after completion of the required operation for initialization, determines the effective direction of the bidirectional bus driver 23 via the control bus 36 and transmits a ready signal to the main processor 11 via the buslines 31 and 26. Upon receiving the ready signal from the sub-processor 12 at ST2, the main processor 11 proceeds to ST3 and transmits selection data from the output port P to the memory selector 25 via the data bus 30. As the memory selector 25 receives the selection data and decodes them, it enables signal CS0 and disables signals CS1 and CS2. (CS3 may be either enabled or disabled.) Then, signal CS0 on the signal line 43 becomes low and the bus drivers D1 and D2 are made effective so as to connect the data bus 26, the address bus 27 and the control bus 28 of the main processor 11 respectively with the data bus 37, the address bus 38 and the control bus 39 of the memory 21 of the magnetic card reading/writing device 5 so that the main processor 11 becomes accessible to the memory 21 for data for magnetic recording. Subsequently, the main processor 11 performs a data processing operation required to convert the boarding information into data to be magnetically recorded, which are stored in the memory 21.

Then at ST6, the main processor 11 transmits selection data from the port P via the data bus to the memory selector 25, which, upon decoding the transmitted selection data, enables signal CS1 and disables all the other signals CS0, CS2 and CS3. At this stage, since only CS1 becomes low on the signal line 44 to make the bus drivers D3 and D4 effective so as to connect the data bus 31, the address bus 32 and the control bus 33 of the sub-processor 12 respectively with the data bus 37, the address bus 38 and the control bus 39 of the memory 21, so that the sub-processor 12 becomes accessible to the memory 21. Then the main processor 11 determines the effective direction of the bidirectional bus driver 23 and transmits status data to inform the sub-processor 12 that signal CS1 is enabled and that the data to be magnetically recorded is stored in the memory 21, and instructing the sub-processor 12 to operate the magnetic card reading/writing device 5.

At ST8, the main processor 22 transmits selection data from port P via the data bus 30 to the memory selector 25, which, upon decoding the transmitted selection data, enables signal CS2. Then, signal CS2 becomes low on the signal line 45 to make the bus drivers D5 and D6 effective so as to connect the data bus 26, the address bus 27 and the control bus 28 of the main processor 11 respectively with the data bus 40, the address bus 41 and the control bus 42 of the printing data memory 22 so that the main processor 11 becomes accessible to the memory 22. Now the main processor 11 performs the data processing operation required to convert the boarding information into data to be printed. At ST10, the main processor 11 receives from the sub-processor 12 via the bus lines 31 and 26 a report of the completion of the operation of the magnetic card reading/writing device 5 and, at ST11, the data for printing obtained at ST10 is stored in the memory 22.

Then at ST12, the main processor 11 transmits selection data from the port P via the data bus 30 to the memory selector 25, which, upon decoding the transmitted selection data, enables signal CS3 and disables all the other signals CS0, CS1 and CS2. Then, only the signal CS3 becomes low on the signal line 46 to make the bus drivers D7 and D8 effective so as to connect the data bus 31, the address bus 32 and the control bus 33 of the sub-processor 12 respectively with the data bus 40, the address bus 41 and the control bus 42 of the memory 22 so that the sub-processor 12 is accessible to the memory 22. AT ST13, the main processor 11 determines the effective direction of the bidirectional bus driver 23 via the control bus 29, and transmits status data to the sub-processor 12, informing it that signal CS3 is enabled and that the data for printing is stored in the memory 22, instructs the sub-processor 12 to operate the thermal head printer 6.

When only one ticket card is to be issued, the whole operation terminates at this stage. If, on the other hand, there are two or more cards to be issued, signal CS0 is enabled at ST14 as in the case of ST3 and the main processor 11 becomes accessible to the memory 21. Then at ST15, the main processor 11 performs a data processing operation to convert the given boarding information into data to be magnetically recorded. When the sub-processor 12 reports completion of the operation of the thermal head printer 6 at ST16, the program returns to ST5 to store the data for magnetic recording in the memory 21. The above described operation will be repeated a number of times, corresponding to the number of tickets to be issued.

Figure 5:
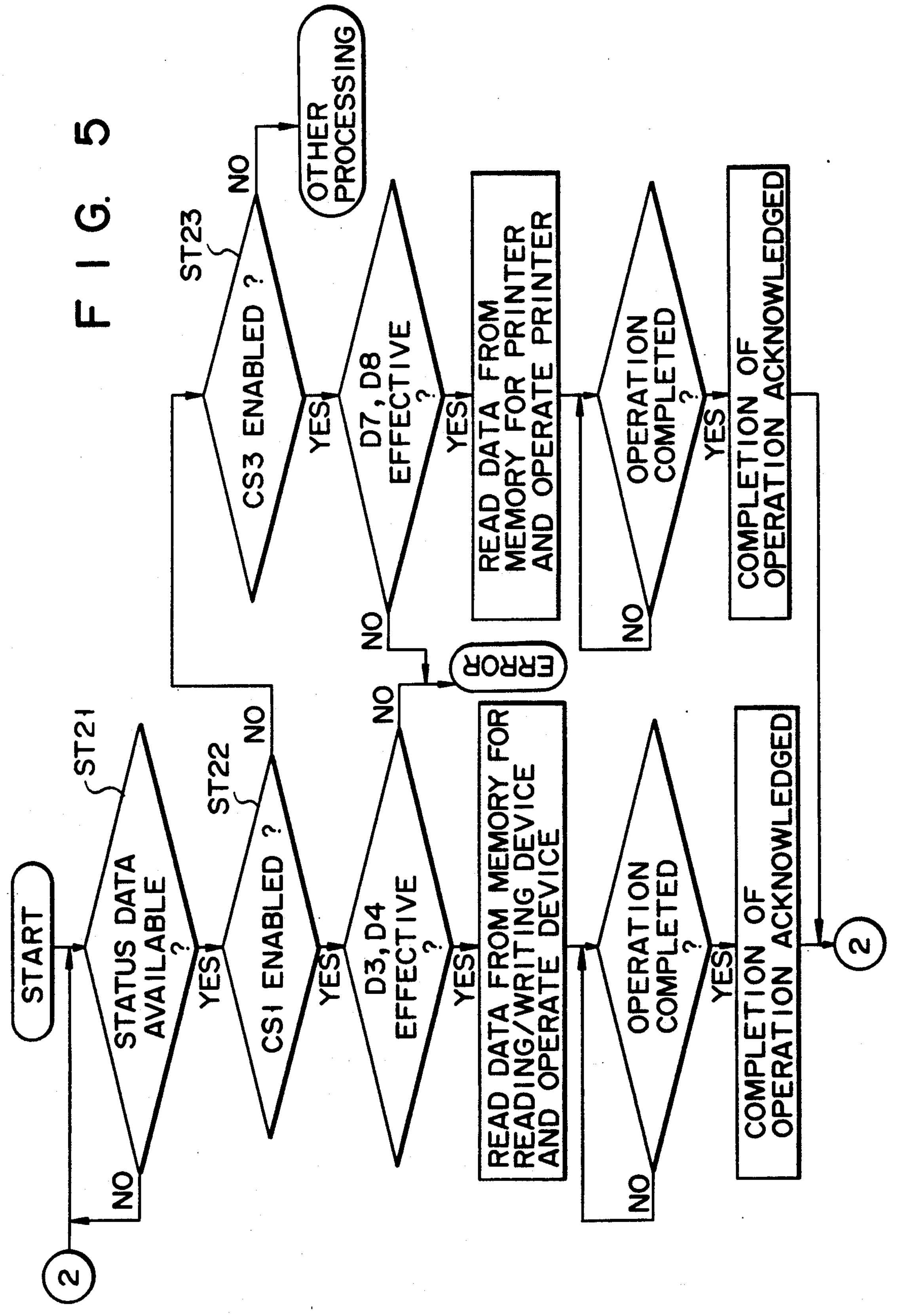

On the other hand, the sub-processor 12 executes a given program in a manner as illustrated in the flow chart of FIG. 5, in parallel with the operation of the main processor 11. AT ST21, upon receiving status data transmitted from the main processor 11, the sub-processor 12 identifies the type of data. When the sub-processor 12 verifies at ST22 that the received status data are data informing it that signal CS1 is enabled, it checks if both bus drivers D3 and D4 are effective. When the bus drivers D7 and D8 are found to be effective, it reads the data for printing stored in the memory 22 and causes the thermal printer 6 to print the data through the data bus 31 and the control bus 35. As soon as the printing operation is completed, the sub-processor 12 determines the effective direction of the bidirectional bus driver 23 so as to report the completion of printing to the main processor 11 via the bus lines 31 and 26.

With a card issuing apparatus having a configuration as described above, a card taken out from either stocker 1 or 2 is first transported by the convey path 3 to the magnetic card reading/writing device 5, where certain data is magnetically recorded on the magnetic stripe provided on the back of the card. Then the card is carried to the thermal printer 6, where the corresponding data is printed on the front surface of the card. After completion of the printing operation, the card is carried further to the card issuing slot 4, where it is issued as a boarding ticket. Since the magnetic card reading/writing device 5 and the thermal printer 6 are not required to operate simultaneously, only one sub-processor 12 sequentially controls the operation of the magnetic card reading/writing device 5 and the thermal printer 6 under the control of the main processor 11.

It should be noted that this card issuing apparatus is provided with a pair of memories 21 and 22 which is accessible from both the main processor 11 and the sub-processor 12 so that the data for magnetic recording as well as for printing required for issuing a card is available to the sub-processor 12 at any time. It should also be noted that each of the memories 21 and 22 are prohibited from being accessed simultaneously by the main processor 11 and the sub-processor 12 because, if the memories 21 and 22 are accessed simultaneously by the main processor 11 and the sub-processor 12, there can occur a collision of the signal transmitted via the data bus 26, the address bus 27 and the control bus 28 for the main processor 11, and the signal transmitted by way of the data bus 31, the address bus 32 and the control bus 33 for the sub-processor 12. With a view to preventing such a collision of signals, the bidirectional bus drivers D1, D3, D5 and D7 are provided for the data buses 26 and 31, while the unidirectional bus drivers D2, D4, D6 and D8 are provided for the control buses 28 and 33 so that the memories 21 and 22 are selectively made accessible by controlling signals CS0, CS1, CS2 and CS3 from the memory selector 25.

When signal CS0 is enabled by the main processor 11, the bus drivers D1 and D2 become effective for the memory 21 to be accessed by the main processor 11. Under this condition, the main processor 11 supplies data for magnetic recording and stores it in the memory 21. When the main processor 11 enables only signal CS1, the bus drivers D3 and D4 become effective for the memory 21 to be accessed by the sub-processor 12, which then reads the data for magnetic recording from the memory 21 under the control of the main processor 11 and causes the magnetic card reading/writing device 5 to perform its operation according to the data. Meanwhile, if the main processor 11 enables signal CS2, the bus drivers D5 and D6 become effective for the memory 22 to be accessed by the main processor 11. Under this condition, the main processor 11 supplies data for printing and stores it in the memory 22. After the magnetic card reading/writing device 5 completes its operation, the main processor 11 enables only CS3 to make the bus drivers D7 and D8 effective for the memory 22 to be accessed by the sub-processor 12. The sub-processor 12 reads the data for printing from the memory 22 under the control of the main processor 11 and causes the thermal printer 6 to perform its operation according to the data.

With the above described embodiment of the invention, the main processor 11 processes at least a part of the data required for operation of the magnetic card reading/writing device 5 as well as a part of the data required for operation of the thermal printer 6 and stores them respectively in the memories 21 and 22. Then the sub-processor 12 reads the data from the memories 21 and 22 under the control of the main processor 11 and operates the magnetic reading/writing device 5 and the thermal printer 6 according to that data. Therefore, the main processor 11 can perform its data processing operation in advance of the operation of the magnetic card reading/writing device 5 and the thermal head 6, and the data processing operation performed by the sub-processor 12 can be significantly simplified to maintain the transporting speed of the cards at an enhanced level and to consequently reduce the overall time required for issuing a card.

Furthermore, with the above described embodiment of the invention, a sub-processor 12 is provided to control the operation of two card processing units, the magnetic card reading/writing device 5 and the thermal printer 6. Thus, the card issuing apparatus is simplified in terms of configuration and hence the cost of manufacturing such an apparatus is significantly reduced as compared with a conventional card issuing apparatus that requires a sub-processor for every card processing unit. Moreover, the working ratio of the sub-processor is naturally increased to a considerable degree.

It may be needless to say that the scope of the present invention is not limited by the above described embodiment. For example, a sub-processor may be provided for each of the card processing units involved, which may be three instead of two as in the case of the above embodiment. Furthermore, if a plurality of card processing units are involved, a single sub-processor may accommodate all of the units or a same number of sub-processors may be provided such that each of the sub-processors accommodates a separate card processing unit.

What is claimed is:

1. A card issuing apparatus comprising:

a conveyor path for a card;

conveying means for moving said card along said conveyor path;

various types of recorder units arranged in series along said conveyor path, and including means for recording data on said card as it is being moved along said conveyor path; and control means for controlling said conveying means and said recorder units, wherein said control means includes:

(a) first processing means for converting information signals received form a signal source into corresponding data for recording particularly suitable for use by said various types of recorder units, respectively;

(b) memory means for storing said data for recording produced by said first processing means; and (c) second processing means for retrieving data stored in said memory means, and for driving at least one of said various types of recorder units in accordance with the retrieved data, while said card passes the respective recorder units, wherein said second processing means drives a plurality of said various types of recorder units in accordance with said data for recording retrieved from said memory means, with data for recording suitable for one of said various types of recorder units being retrieved by said second processing means as said card approaches said one type of recorder unit, and with data for recording suitable for another of said various types of recorder units being retrieved by said second processing means as said card approaches said another recorder unit.

2. A card issuing apparatus according to claim 1, wherein said first processing means includes means for sequentially producing said data for recording particularly suitable for use by said various types of recorder units, respectively, according to the order of said recorder units along said path.

3. A card issuing apparatus according to claim 2, wherein said conveying means includes detecting means connected to said second processing means for detecting the position of said card moving along said conveyor path.

4. A card issuing apparatus according to claim 3, wherein said detecting means includes card sensors arranged along said conveyor path each of which supplies a detection signal to said second processing means when the card has reached a corresponding recorder unit.

5. A card issuing apparatus according to claim 1, wherein said various types of recorder units include a magnetic recording unit having means for magnetically writing said data for recording associated therewith on said card, and a printing unit having means for printing said data for recording associated therewith on said card.

6. A card issuing apparatus according to claim 1, wherein said memory means includes means for storing said data for recording, and a memory access controller means for selectively coupling said storing means to one of said first and second processing means under control of said first processing means.

* * * * *